US010262446B2

(12) United States Patent
Kapinos et al.

(10) Patent No.: US 10,262,446 B2
(45) Date of Patent: Apr. 16, 2019

(54) SYSTEMS AND METHODS TO ALTER PRESENTATION OF VIRTUAL RENDITION BASED ON REAL WORLD OBJECT

(71) Applicant: Lenovo (Singapore) Pte. Ltd., New Tech Park (SG)

(72) Inventors: Robert James Kapinos, Durham, NC (US); Timothy Winthrop Kingsbury, Cary, NC (US); Russell Speight VanBlon, Raleigh, NC (US); Scott Wentao Li, Cary, NC (US); Jonathan Gaither Knox, Morrisville, NC (US); Arnold S. Weksler, Raleigh, NC (US); John Carl Mese, Cary, NC (US); Nathan J. Peterson, Oxford, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/660,176

(22) Filed: Jul. 26, 2017

(65) Prior Publication Data
US 2019/0035124 A1 Jan. 31, 2019

(51) Int. Cl.
*G06T 11/60* (2006.01)
*G06T 3/40* (2006.01)
*G06K 9/00* (2006.01)

(52) U.S. Cl.
CPC .......... *G06T 11/60* (2013.01); *G06K 9/00671* (2013.01); *G06T 3/40* (2013.01); *G06T 2210/21* (2013.01); *G06T 2210/62* (2013.01)

(58) Field of Classification Search
CPC ....... G06T 11/60; G06T 3/40; G06T 2210/62; G06T 2210/21; G06K 9/00671
See application file for complete search history.

(56) References Cited

U.S. PATENT DOCUMENTS

| 2010/0079356 | A1 | 4/2010 | Hoellwarth |
| 2011/0209099 | A1 | 8/2011 | Hinckley et al. |
| 2016/0041614 | A1 | 2/2016 | Mok et al. |
| 2017/0068380 | A1 | 3/2017 | Hong et al. |
| 2017/0162177 | A1* | 6/2017 | Lebeck ............... G06F 21/6218 |
| 2017/0323485 | A1* | 11/2017 | Samec .................. G06T 19/006 |
| 2017/0343811 | A1* | 11/2017 | Mese .................. G02B 27/0172 |

OTHER PUBLICATIONS

John Carl Mese, Arnold S. Weksler, Nathan J. Peterson, Russell Speight Vanblon, "Systems and Methods for Presentation of Images from Camera Concurrently with Presentation of Virtual Reality Content", related U.S. Appl. No. 15/164,045, Applicant's response to Non-Final Office Action filed Oct. 3, 2017.

(Continued)

*Primary Examiner* — Maurice L. McDowell, Jr.
(74) *Attorney, Agent, or Firm* — John M. Rogitz; John L. Rogitz

(57) ABSTRACT

In one aspect, a device includes at least one processor and storage accessible to the at least one processor. The storage bears instructions executable by the at least one processor to present virtual objects of a virtual rendition on a display accessible to the processor and alter presentation of the virtual rendition based on the existence of a real-world object identified by the device.

20 Claims, 7 Drawing Sheets

(56) References Cited

OTHER PUBLICATIONS

John Carl Mese, Arnold S. Weksler, Nathan J. Peterson, Russell Speight Vanblon, "Systems and Methods for Presentation of Images from Camera Concurrently with Presentation of Virtual Reality Content", related U.S. Appl. No. 15/164,045, Final Office Action dated Oct. 20, 2017.

John Carl Mese, Arnold S. Weksler, Nathan J. Peterson, Russell Speight Vanblon, "Systems and Methods for Presentation of Images from Camera Concurrently with Presentation of Virtual Reality Content", related U.S. Appl. No. 15/164,045, Applicant's response to the Final Office Action filed Jan. 19, 2018.

John Carl Mese, Arnold S. Weksler, Nathan J. Peterson, Russell Speight Vanblon, "Systems and Methods for Presentation of Images from Camera Concurrently with Presentation of Virtual Reality Content", Examiner's Answer dated Feb. 15, 2018.

John Carl Mese, Arnold S. Weksler, Nathan J. Peterson, Russell Speight Vanblon, "Systems and Methods for Presentation of Images from Camera Concurrently with Presentation of Virtual Reality Content", related U.S. Appl. No. 15/164,045, Applicant's Reply Brief filed Apr. 13, 2018.

Ming Qian, John Weldon Nicholson, Song Wang, Jatinder Kumar, David Alexander Schwarz, "Presentation of Augmented Reality Images at Display Locations that do Not Obstruct User's View", file history of related U.S. Appl. No. 16/018,351, filed Jun. 26, 2018.

Rachel Metz, "How to Avoid Real Objects While in a Virtual World", Jun. 12, 2105, https://www.technologyreview.com/s/538336/how-to-avoid-real-objects-while-in-a-virtual-world/.

John Carl Mese, Arnold S. Weksler, Nathan J. Peterson, Russell Speight Vanblon, "Systems and Methods for Presentation of Images from Camera Concurrently with Presentation of Virtual Reality Content", related pending U.S. Appl. No. 15/164,045, filed May 25, 2016.

Adam, Jos J., Bovend'Eerdt, Thamar J.H., Van Dooren, Fleur E.P., Fischer, Martin H., Pratt, Jay, "The closer the better: Hand proximity dynamically affects letter recognition accuracy", Attention, Perception, & Psychophysics, Oct. 2012, vol. 74, Issue 7, pp. 1533-1538. Retrieved from https://link.springer.com/article/10.3758/s13414-012-0339-3#citeas.

Festman, Y, Adam, JJ, Pratt, J, Fischer, MH. "Both hand position and movement direction modulate visual attention". Frontiers in Psychology. 2013; 4:657. Retrieved from https://www.ncbi.nlm.nih.gov/pmc/articles/PMC3787593/.

Reed, C. L., Betz, R., Garza, J., & Roberts, R. (2010). Grab it! Biased attention for functional hand and tool space. Attention, Perception, & Psychophysics, 72, 236-245.

Reed, C. L., Grubb, J. D., & Steele, C. (2006). Hands up: Attentional prioritization of space near the hand. Journal of Experimental Psychology. Human Perception and Performance, 32, 166-177, Abstract. Retrieved from https://www.ncbi.nlm.nih.gov/pubmed/16478334.

Rosenbaum, D. (2017). Knowing Hands. In Knowing Hands: The Cognitive Psychology of Manual Control (Book Description) Cambridge: Cambridge University Press. Retrieved from https://www.cambridge.org/core/books/knowing-hands/4F1226345954CA417750241003716971#fndtn-information.

* cited by examiner

700

SETTINGS

❑ ENABLE ALTERATION/PRESENTATION OF VIRTUAL OBJECTS BASED ON REAL-WORLD OBJECTS —702

SPECIFY:

❑ CHANGE TRANSPARENCY OF VIRTUAL OBJECTS TO SEE REAL-WORLD OBJECTS; OR —704

❑ PRESENT VIRTUAL OBJECTS OF SAME TYPE IN PLACE OF REAL-WORLD OBJECT; OR —706

❑ PRESENT VIRTUAL OBJECTS FROM VR/AR EXPERIENCE IN PLACE OF REAL-WORLD OBJECT. —708

---

❑ PRESENT VIRTUAL OBJECT AS SAME SIZE AS REAL-WORLD OBJECT —710

❑ PRESENT VIRTUAL OBJECT SO THAT IT APPEARS LARGER —712

❑ CORRELATE SIZE EXAGGERATION/ TRANSPARENCY TO DANGER LEVEL OF REAL-WORLD OBJECTS AND/ OR SPEED OF USER MOVEMENT —714

❑ NOTIFY USER OF ALL REAL-WORLD OBJECTS WITHIN ☐ —718
FOOT RADIUS OF USER —716

SELECT VIRTUAL OBJECTS TO PRESENT IN PLACE OF REAL-WORLD OBJECTS —720

722 { ❑ ROCKS
      ❑ WALLS/VR BOUNDARIES

SPECIFY: ☐ —724

FIG. 7

SYSTEMS AND METHODS TO ALTER PRESENTATION OF VIRTUAL RENDITION BASED ON REAL WORLD OBJECT

BACKGROUND

Virtual reality (VR) and augmented reality (AR) content and devices are emerging in today's technology marketplace. However, as recognized herein, there may be instances where a user's immersion in such content can be dangerous to the user, such as when the user is interacting with a virtual reality environment and collides with a real-world object that the user was not aware of owing to the user's immersion in the virtual reality environment. There are currently no adequate solutions to the foregoing computer-related, technological problem.

SUMMARY

Accordingly, in one aspect a device includes at least one processor and storage accessible to the at least one processor. The storage bears instructions executable by the at least one processor to present virtual objects of a virtual rendition on a display accessible to the processor and alter presentation of the virtual rendition based on the existence of a real-world object identified by the device.

In another aspect, a method includes presenting one or more virtual objects on a display as part of a virtual rendition and altering presentation of the virtual rendition based on identification of a real-world object within a proximity to a user.

In still another aspect, an apparatus includes a first processor, a network adapter, and storage. The storage bears instructions executable by a second processor for identifying a real-world object. The instructions are also executable by the second processor for altering presentation, on a display, of a virtual rendition based on the identifying of the real-world object. The first processor transfers the instructions to the second processor over a network via the network adapter.

The details of present principles, both as to their structure and operation, can best be understood in reference to the accompanying drawings, in which like reference numerals refer to like parts, and in which:

BRIEF DESCRIPTION OF THE DRAWINGS

FIG. 7 is an example user interface (UI) in accordance with present principles.

DETAILED DESCRIPTION

Figure 1:
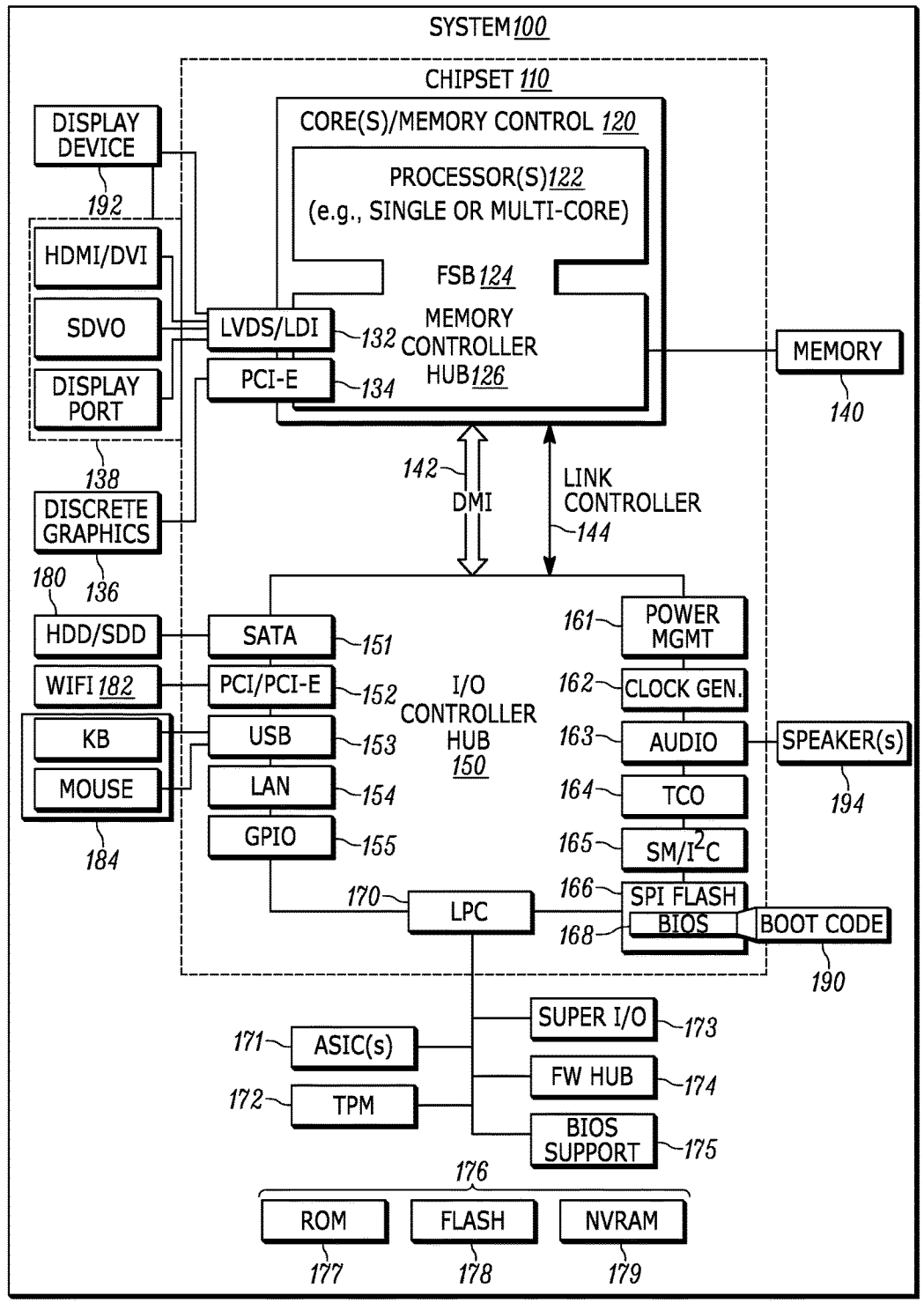
FIG. 1 is a block diagram of an example system in accordance with present principles.

Disclosed herein are systems and methods to alter presentation of virtual objects presented as part of a virtual rendition so that a user may avoid real-world objects with which the user may otherwise collide or bump into. Thus, an AR/VR system in accordance with present principles may use its user motion and position tracking to determine whether the user is sitting or standing, stationary or moving.

If the user is sitting, most AR objects may appear with fully rendered fidelity and minimal if any transparency. However, real-world objects that are in arm's reach to a user may still be perceptible to a user. If the user is standing and/or moving, AR objects that are in the user's path may become more transparent and/or dim so that actual, real-world impediments in the user's path can be seen by the user and virtual objects do not lead the user into danger. Certain types of areas and objects within the real world may even be rated as to the danger of causing collision if AR/VR objects were to obstruct the user's view.

Additionally, in some embodiments the dimness, transparency, and/or rendering of the virtual rendition may depend on the user's velocity/speed and direction of movement. The greater the potential for user movement, the greater the radius may be relative to the user for real-world objects for which the user should be made aware. Virtual objects that might be directly impeding a user's ability to view real-world objects for which the user should be made aware can be highly modified. Those virtual objects less likely to be in the path can be adjusted less. Virtual objects completely outside the movement path or unreachable by the user can be fully rendered. Additionally, if the user wanders into an area designated as high-traffic (e.g., based on an identified area type, such as a side walk or hallway, being designated in a relational database as being high-traffic), the dangerous real-world area can be made visible to the user without virtual augmentation even if no impediments are currently in view.

In another aspect, real world objects and boundaries may be represented as context-appropriate objects in a VR world. For example, a chair in the real world may be represented as a large rock in a landscape VR world. This prevents disruption of the VR experience and reduces the chance of user injury that might arise from a collision with the real-world object.

VR objects may be chosen based on VR location, VR application or game type, or other VR objects that might be used. For example, if the user were engaging in a VR game as opposed to a virtual office space, or experiencing VR mountains as opposed to a VR beach, these factors may change which VR objects would be selected by the device for presentation. Thus, the device may use similar objects to what already exists in the VR world to help the user avoid a collision. In other embodiments, virtual objects of the same type as detected real-world objects may be used so that, for example, if a room in which a user is disposed already has a chair in it then that same chair could be duplicated in the VR world with a VR chair to prevent the user from touching or bumping into the real-world chair in the room.

Furthermore, in some embodiments the VR object may be created slightly larger than the real-life object so the user has some buffer space before the user reaches the real-world object. Additionally, based on the danger level of the real-world object this buffer may change. For example, a set of stairs may have a big buffer since the user may fall and injure themselves more severely than bumping into a soft couch that would have a relatively smaller buffer.

What's more, in some embodiments virtual objects may be selected for presentation based on the specific user of the AR/VR, and/or based on that user's likes or dislikes.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general-purpose single- or multi-chip processor that can execute logic by means of various lines such as address lines, data lines, and control lines and registers and shift registers. Moreover, any logical blocks, modules, and circuits described herein can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for clarity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
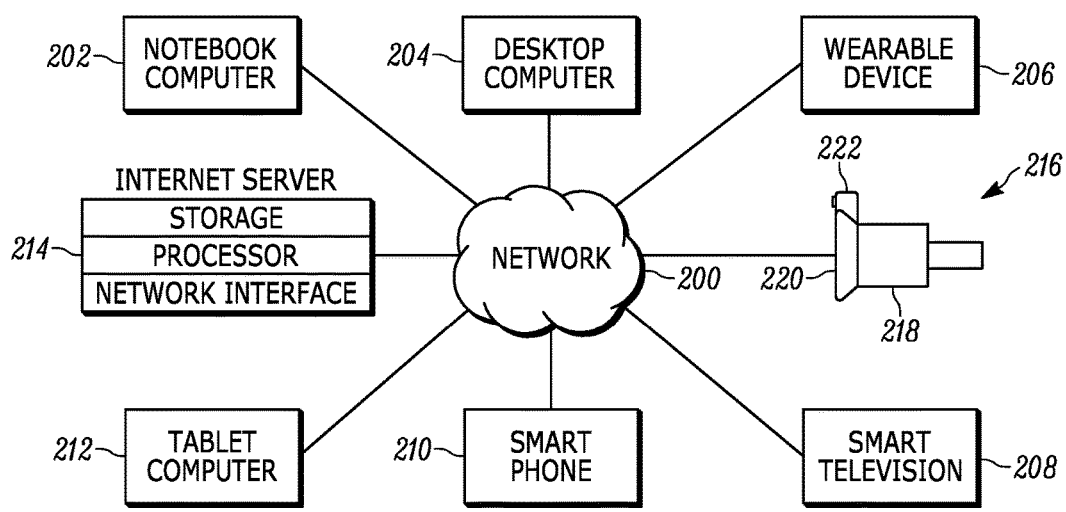
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a virtual/augmented reality headset 216, and a server 214 such as an Internet server that may provide cloud storage accessible to the devices 202-212, 216. It is to be understood that the devices 202-216 are configured to communicate with each other over the network 200 to undertake present principles.

Describing the headset 216 in more detail, it may include a housing 218 to which a display device 220 is coupled for presenting virtual reality (VR) and/or augmented reality (AR) content as well as other information, images and video data. Thus, in some embodiments the display device 220 may include an at least partially transparent display through which a wearer of the headset may view real-world objects and on which the headset 216 may present AR objects. In other embodiments, the display device 200 may include a VR display.

The headset 216 may also include a camera 222 that may be a digital camera or other type of camera accessible to a processor on the device 216 that presents AR/VR content and images from the camera via the display device 220. Note that though not shown for clarity, the headset 216 may include still other components such as speakers, biometric sensors, additional cameras, and a network interface for wired and/or wireless communication with the other devices of FIG. 2 via the Internet, a local area network (LAN), a Bluetooth network, etc. The headset 216 may also include position sensors in addition to the camera for sensing a location and orientation of the headset 216, such as a GPS transceiver, an accelerometer, and a gyroscope.

Note that while a VR/AR headset is described above in reference to the device 216, other types of headsets and other devices may also be used in accordance with present principles, such as electronic glasses and other devices using so-called "heads up" displays and transparent displays. Other types of non-headset devices may also be used, such as smartphones, tablets, etc. that execute AR or VR software, such as Google's Tango AR software.

Figure 3:
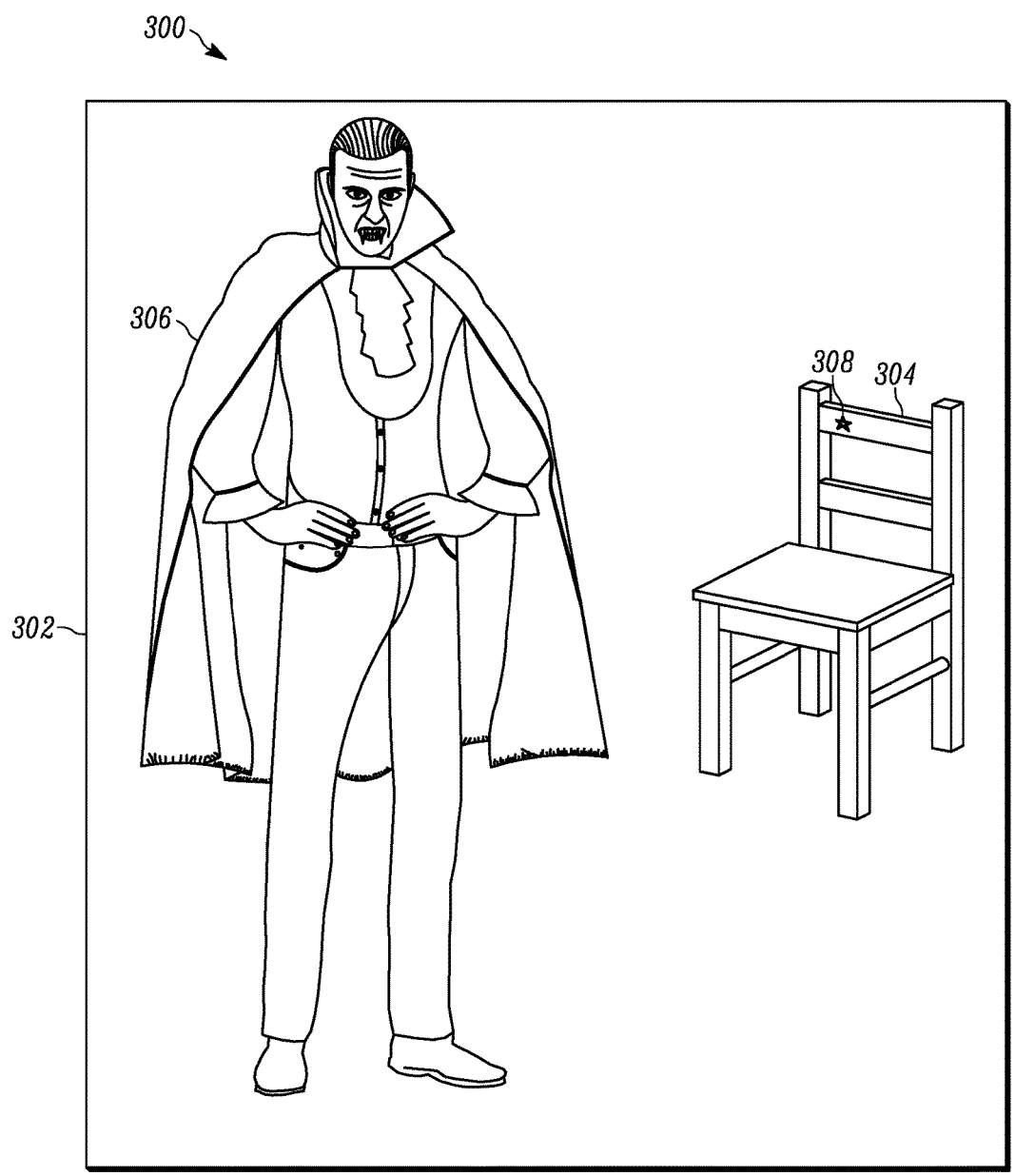
FIGS. 3-5 are example illustrations in accordance with present principles.

Referring now to FIG. 3, it shows an example illustration 300 of a virtual rendition in accordance with present principles. It is to be understood that the illustration 300 shown in FIG. 3, as well as the illustrations 400 and 500 respectively shown in FIGS. 4 and 5, are from the perspective of a user while wearing an AR/VR headset to view AR content or VR content on a display of the AR/VR headset.

VR content 302 is shown in FIG. 3. The VR content 302 includes a first virtual object 304 that is a virtual chair and a second virtual object 306 that is a virtual vampire. Furthermore, while the first virtual object 304 is in fact a computer-generated graphical representation of a real-world chair, in the VR experience represented by the content 302 it corresponds to the real-world position, relative to the user while wearing the headset, of the real-world chair at a position in the real-world space in which the user is actually physically disposed. Put another way, relative to the real-world position of the user, the virtual object 304 is presented in the content 302 as a virtual representation of the real-world chair where the real-world chair is actually disposed. Additionally, a graphical icon 308 in the VR content 302 serves as an indication that the virtual object 304 has been placed in the VR content 302 to represent the actual real-world position of an object of the same object type (e.g., furniture or chairs specifically).

Further still, in this example the virtual object 304 is shown in the VR content 302 so that it appears to the user to be larger in at least one respect or dimension than the real-world chair at the corresponding real-world position. Thus, should a user wish to avoid the chair while immersed in the VR experience, the user may do so with some room to spare owing to the virtual object 304 being represented as larger and hence occupying a larger area of space in the virtual world than the real-world chair itself does at the corresponding/same position in the real world.

Figure 4:
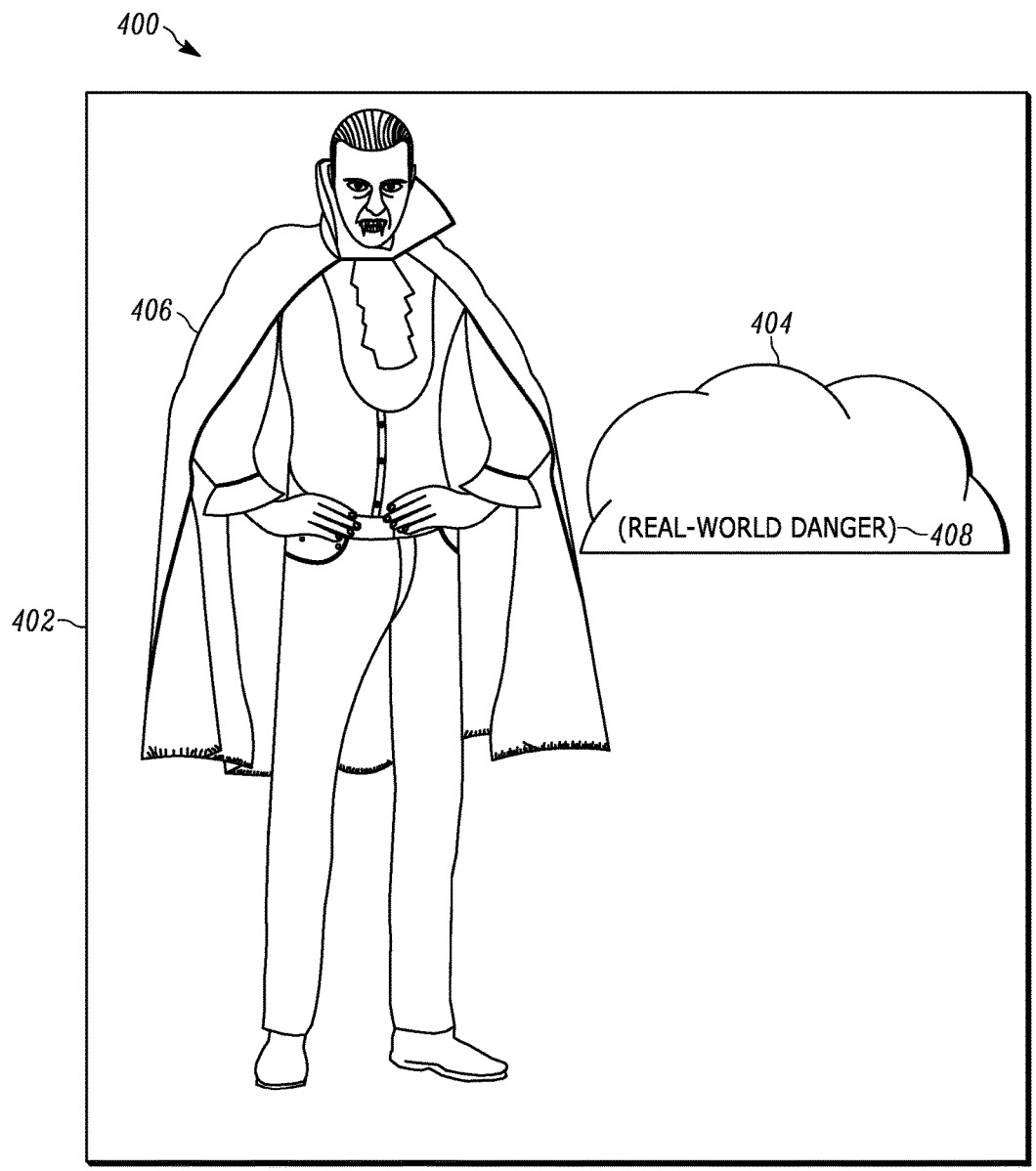
Figure 5:
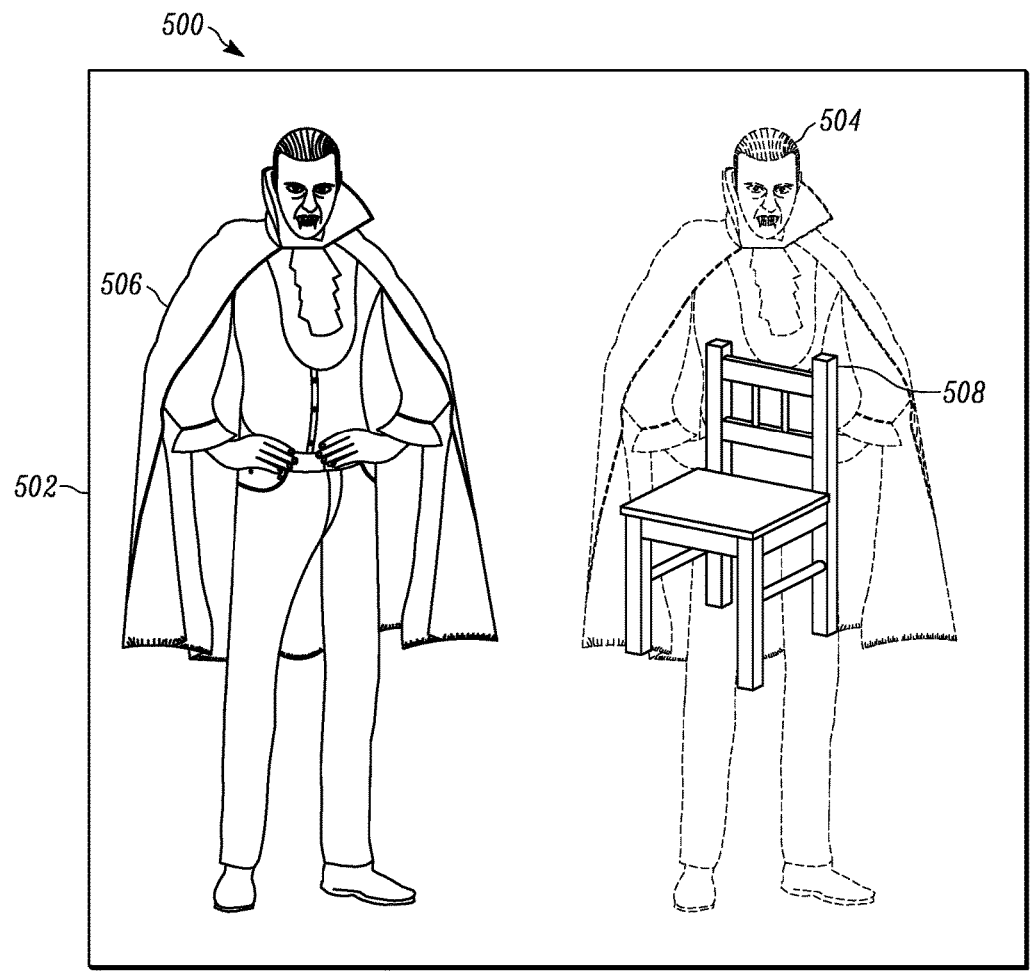

Before moving on to the description of FIG. 4, it is to be understood in reference to FIG. 3 that the virtual rendition has been altered in accordance with present principles in the respect that the virtual object 304 has been presented responsive to the headset identifying the real-world chair at the corresponding position. But, the virtual object 304 might not be presented at all before any such identification. Thus, had the real-world chair not existed at the corresponding position in the real world, the headset would not put the virtual object 304 at that corresponding position within the virtual content 302 and indeed may not present the virtual object 304 at all during the entirety of the user's VR experience with the VR content 302.

FIG. 4 shows another example illustration 400 of a virtual rendition in accordance with present principles. VR content 402 is shown. The VR content 402 includes a first virtual object 404 and a second virtual object 406. As may be appreciated from this figure, the first virtual object 404 is a computer-generated graphical representation of a boulder and the second virtual object 406 is a virtual vampire. The virtual object 404, in the VR experience represented by the content 402, corresponds to the real-world position (relative to the user while wearing the headset) of a real-world object of a different object type than the boulder. Thus, in this example the virtual object 404 is presented in the VR content 402 to correspond to where a real-world wall of a building is actually disposed, with the boulder 404 establishing part of the vampire VR experience regardless of the type of real world object at the corresponding position (in this case, the wall).

The boulder 404 may have been provided as part of the content 402 by a creator or provider of the content 402. In some embodiments, the creator or provider may even provide a set of reference objects with the main body of the content 402. The headset or other device may then, when presenting the VR experience to the user, access the set of reference objects germane to the VR content 402 itself to select and insert a virtual object in the VR content 402 that matches the rest of the VR content 402, or at least does not look out of place or irrelevant to the VR content 402 as a chair might otherwise look in a vampire VR experience.

Additionally, FIG. 4 shows text 408 in the VR content 402. The text 408 is overlaid on the virtual object 404 and indicates a real-world danger at the corresponding position of the boulder 404 in the real world.

Further still, the virtual object 404 is shown in the VR content 402 so that it appears to the user to be larger in at least one respect or dimension than the real-world chair at the corresponding real-world position. Thus, the user can avoid the real-world chair while immersed in the VR experience by avoiding the virtual boulder 404 and in fact do so with some room to spare owing to the boulder 404 being represented larger relative to the user than the real-world chair.

Before moving on to the description of FIG. 5, it is to be understood in reference to FIG. 4 that presentation of the virtual rendition has been altered in accordance with present principles in the respect that the virtual object 304 has been presented responsive to the headset identifying the real-world chair at the corresponding real-world position. Had the real-world chair not existed at the real-world position, the headset would not put the virtual object 404 at that corresponding position within the virtual content 402 and indeed may not present the virtual object/boulder 404 at all during the entirety of the user's VR experience with the VR content 402.

Continuing the detailed description in reference to FIG. 5, it shows yet another example illustration 500 of a virtual rendition in accordance with present principles. AR content 502 is shown. The AR content 502 includes a first virtual object 504 that is a virtual vampire and a second virtual object 506 that is also a virtual vampire. As also shown in FIG. 5, an image of a real-world chair 508 is shown at a corresponding real-world position, relative to the user, that is the same as the virtual world position of the virtual object/vampire 504 shown in the AR content 502.

Note that the vampire 504 is shown with dotted lines in the illustration 500 to illustrate that it has been made relatively more transparent/less opaque than when fully rendered so that a user can view the real-world chair in the user's real world. The real-world chair may be made viewable by providing a camera feed on the headset's display of the real-world chair as mixed with the AR content 502 (e.g., overlaid or underlaid with the AR content), or may be made viewable owing to the vampire 504 being made transparent enough so that the real-world chair becomes perceptible to the user through an at least partially transparent display of the headset on which the content 502 is being presented. This may establish an alteration of the virtual rendition in that the vampire 504 may be made at least partially transparent relative to how it might have previously been fully rendered during the same AR experience.

Thus, it is to be understood that the vampire 504 may have been presented less transparent/more opaque while the user was experiencing the AR content 502 but prior to the user coming within the real-world proximity (e.g., a threshold real-world distance) to the chair 508. Then, once the user comes within the proximity in the real world to the chair 508, the opacity of the vampire 504 may be changed so that the virtual vampire 504 becomes more transparent, thereby allowing the user to view the real-world chair and avoid colliding with it as the user walks around the real world while immersed in the AR experience.

In some embodiments, the change in transparency of the virtual vampire 504 may even be based on whether the user is sitting or standing while immersed in the AR content. The headset may use its motion and position tracking to determine whether the user is sitting or standing, and/or stationary or moving. The motion and position tracking may be based on input from one or more cameras on or in communication with the headset to track the user's position, as well as motion sensors such as accelerometers, gyroscopes, altimeters, etc. Infrared tracking and/or a fixed-position tracking station in wireless communication with the headset may also be used.

In some embodiments, if the user is sitting then most AR objects may appear with fully rendered fidelity and hence minimal or no transparency. However, real world objects that are within arm's reach of the user (or another threshold distance of the user) may still be made visible to the user while experiencing the AR content 502 by making more-transparent any virtual objects that are in the user's line of sight to where the respective real-world objects are located so that the user does not collide with them.

If the user is standing and moving, AR objects that are in the user's movement path or expected movement path (e.g., walking path, arm movement path, etc.) may become more transparent and dim so that actual impediments/real world objects in the user's path can be seen and avoided, and hence virtual objects do not lead the user into a collision with the real-world objects. In some embodiments, this feature during standing may be dynamic, with areas within the real-world environment being rated based on danger of the user colliding with real world objects in those respective areas if virtual objects were fully rendered at positions within the AR content corresponding to the actual positions of the respective real-world objects in the area. The user's expected movement path itself may be predicted based on upcoming AR content the headset is to present as the user progresses through the AR content, with the headset knowing based on the content it is to present in the future which direction(s) a user may move to interact with the AR content.

Figure 6:
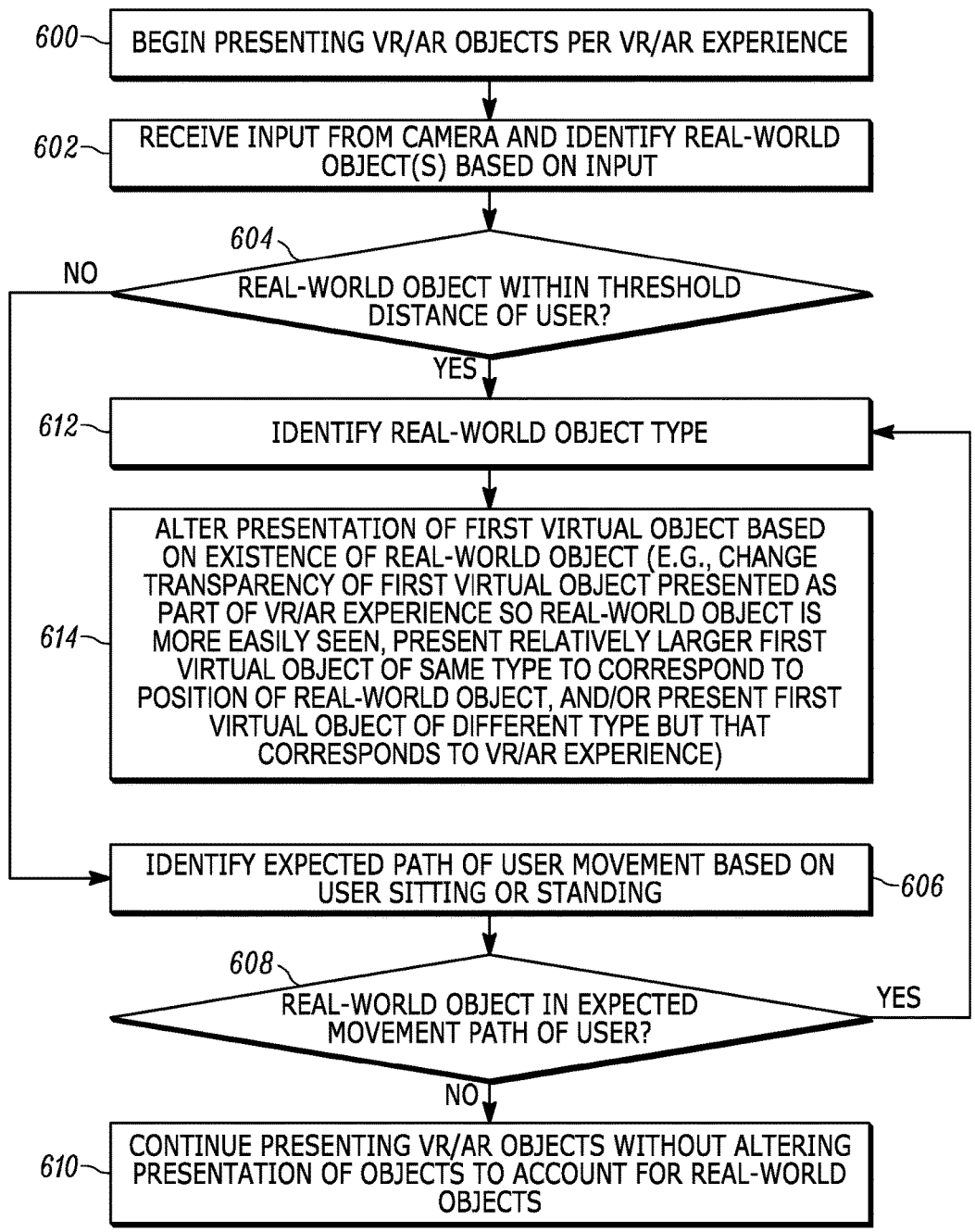
FIG. 6 is a flow chart of an example algorithm in accordance with present principles.

Referring now to FIG. 6, it shows example logic in accordance with present principles that may be executed by a device such as the system 100, a headset such as one of the headsets mentioned above, and/or another device operating in conjunction with a headset such as a server, video game console, or other computer. Beginning at block 600, the device may begin presenting VR or AR objects as part of a virtual rendition according to a VR or AR experience/content the user has provided input to initiate. From block 600 the logic may then move to block 602. At block 602 the device may receive input from one or more cameras and, based on the input, identify one or more real-world objects. Cameras providing the input may include one or more cameras on the device itself that is being worn by the user as well as other cameras within the user's environment and in communication with the device. For example, input from one or more stationary cameras or webcams mounted at various locations within the environment may be used.

To identify the one or more real-world objects at block 602, object recognition software may be used. Once one or more real world objects have been identified, the device may access a relational database correlating real world objects with respective indicators that those objects pose a potential danger to a user should the user collide with them. The relational database may even correlate real world objects to particular levels of danger or danger ratings for those objects. This danger data may then be used to determine, for instance from another relational database, how much larger a virtual object to be presented in place of a real-world object should be made to look to the user so that the higher the danger, the larger the virtual object is made to appear to ensure the user does not collide with the real-world object at the corresponding position. The relational databases may have been created by a creator of the VR/AR experience itself and made accessible to the device over, e.g., the Internet.

Also at block 602, the device may determine, based on the camera input and even other types of input that might also be received at block 602, a distance between the user and various objects within the environment that are recognized by the device. The device may do so by using so-called indoor GPS and/or an indoor positioning system. In addition, or alternatively, one or more images from the cameras may be analyzed using spatial analysis software to derive the respective locations of various objects relative to the user where another location shown in and/or identified from the image is already known by the device. Furthermore, if the objects are electronic devices having their own respective GPS or other position receivers, position data may be received from them to identify the locations of those devices and hence distance from the user to those devices based on the GPS coordinates of those respective devices relative to the GPS coordinates of the device itself that is being worn by the user. A laser rangefinder on the device or disposed at a fixed and known location within the environment may also be used to identify the locations of various objects and hence the distance between them and the user/device. Additionally, or alternatively, input from other types of proximity sensors may also be used, such as input from an infrared (IR) proximity sensor. Echolocation may also be performed using a sound transceiver to identify the location of a user and various objects within the environment.

Still in reference to FIG. 6, from block 602 the logic may then proceed to decision diamond 604. At diamond 604 the device may determine whether one or more real-world objects that have been identified at block 602 are within the user's proximity, such as determining whether the object(s) is within a particular threshold distance to the user. The determination at diamond 604 may be made based on the distance between the real-world object(s) and the user as also may have been identified at block 602. An affirmative determination at diamond 604 may cause the logic to proceed to block 612, which will be described shortly. However, first note that a negative determination at diamond 604 may instead cause the logic to proceed to block 606.

At block 606 the device may identify an expected path of user movement based on whether the user is sitting or standing and hence how much potential for user movement there might be, and/or based on expected user interactions (and hence movement) with the AR/VR content based on known events in the AR/VR content that are upcoming.

For instance, if the user is determined to be sitting, the device may determine that the expected path of movement of the user might be limited to the user's maximum range of motion using his or her arms so that the expected path does not exceed a radius equal to the length of the user's arms. The length of the user's arms may be identified using one or more of the techniques described above, such as execution of spatial analysis software. If the user is determined to be standing, the device may determine that the expected path of movement is, for example, anywhere within a preset radius of the user or anywhere within a room in which the user is currently disposed.

Expected user interactions may be used to determine the expected path if, for instance, the device knows that at a certain point in presentation of the AR/VR content the user will be requested to extend their arm to interact with a virtual object or will be requested to move a certain distance from the user's current location to interact with a virtual object. The distance that the device will represent the virtual object to be interacted with as being from the user may thus be used as the distance within the real world that the user might be expected to move.

From block 606 the logic may then proceed to decision diamond 608. At diamond 608 the device may determine whether, based on the expected path of movement identified at block 606 and respective locations of various objects relative to the user identified at block 602, one or more real-world objects are in the expected three-dimensional, real-world expected path of movement of the user. For instance, at diamond 608 the device may compare coordinates (e.g., three-dimensional Cartesian coordinates or GPS coordinates) for the expected movement path to coordinates of the real-world objects to determine whether any part of the real-world objects share coordinates with the expected movement path.

An affirmative determination at diamond 608 may cause the logic to proceed to block 612, which will be described shortly. However, first note that a negative determination at diamond 608 may instead cause the logic to proceed to block 610. At block 610 the device may continue presenting the AR/VR content without altering presentation of one or more virtual objects to account for real-world objects with which the user might otherwise collide.

Now describing block 612, at block 612 the device may identify, for each real-world object identified at block 602, an object type associated with the real-world object. This may be done by the device by, e.g., accessing a relational database correlating particular objects with particular object types to thereby identify a corresponding object type from the database for an identified object. From block 612 the logic may then proceed to block 614.

At block 614 the device may alter presentation of a first virtual object based on the existence of one or more real-world objects as described herein. For instance, at block 614 the device may alter presentation of a first virtual object by presenting it when it might not otherwise be presented in the AR/VR content at all. Further, the virtual object may be presented so that it appears to the user to be the same size or a similar size as the corresponding real-world object it is to represent, or may be presented so that it appears larger than the corresponding real-world object. Further, the virtual object that is to be presented may be of the same object type as the corresponding real-world object, or may be a different object type that is instead relevant to the AR/VR content itself.

As another example, at block 614 the device may alter presentation of a first virtual object by making it more or less transparent depending on whether the user is expected to collide with the object per the user's expected movement path. Additionally, or alternatively, the first virtual object may be made transparent based on whether the user is sitting or standing, and/or based on the associated danger level for the real-world object so that more dangerous real-world objects are more-easily seen owing to overlaid virtual objects being made more transparent. For the danger level/ rating aspect, a relational database may be accessed that correlates respective danger levels (as may have been identified as set forth above) with respective levels of transparency the device is to apply to the virtual object.

Now in reference to FIG. 7, an example settings user interface (UI) 700 is shown that is presentable on a display accessible to a device undertaking present principles, such as a display accessible to the device undertaking the logic of FIG. 6. The display may be coupled to the device itself, or it may be a display of a separate apparatus in communication with the device. In any case, the UI 700 may be presented to configure settings of the device and/or corresponding AR/VR software (hereafter "device" for simplicity) in accordance with present principles. Further, it is to be understood that each of the options from the UI 700 to be discussed below may be selected by selecting the corresponding check box adjacent to each respective option.

Beginning first with option 702, it may be selectable to enable/configure (hereafter "enable" for simplicity) the device to alter presentation of virtual renditions based on the existence of real-world objects in accordance with present principles. For example, the option 702 may be selected to enable the device to alter virtual renditions as described above in reference to FIGS. 3-5, and/or to enable the device to undertake the logic of FIG. 6.

The UI 700 may also include one or more options 704-708 that are selectable by a user to specify the type of virtual object alteration(s) the user wishes the device to perform. Option 704 may be selected to enable the device to change the transparency of virtual objects so that the user can see real-world objects through at least semi-transparent virtual objects. Option 706 is selectable to enable the device to present virtual objects corresponding to real-world objects where the virtual objects will be of the same object type as the respective real-world objects. Option 708 is selectable to enable the device to present virtual objects corresponding to real-world objects where the virtual objects will be germane to a particular AR/VR experience or content being viewed.

As also shown in FIG. 7, the UI 700 may include an option 710 that is selectable to enable the device to present virtual objects so that they appear to a user to be the same size as corresponding real-world objects as disclosed herein. Option 712 may be selected to enable the device to present virtual objects so that they appear to the user to be larger than the corresponding real-world objects as also disclosed herein.

Options 714 and 716 are also shown on the UI 700. Option 714 may be selected to enable the device to correlate size exaggerations (e.g., making the size of the virtual object larger per option 712), and/or to correlate transparency levels for virtual objects, to danger levels of respective real-world objects. Additionally, or alternatively, option 714 may be selected to enable the device to correlate size exaggerations and/or transparency levels to the speed of a user's movement while interacting with AR/VR content. Thus, the faster the user moves, the larger or more transparent a virtual object may be made to look so that a user may more easily recognize it and avoid a collision. Speed to size/transparency of virtual objects may also be looked up by the device using a relational database.

Option 716 may be selected to enable the device to notify the user of all real-world objects that are within a predefined distance of the user, with the predefined distance being specifiable by the user by providing distance input to input box 718. The notification may be in the form of presenting virtual objects corresponding to respective real-world objects as disclosed herein or making virtual objects more transparent as disclosed herein. Other types of notifications may also be used, such as text notifications and/or audible notifications.

The UI 700 may also include a setting 720 providing options 722 selectable by a user to specify particular virtual objects the user wishes the device to present in place of real-world objects so that the user will recognize the specified virtual objects as corresponding to real-world objects that should be avoided. In the example shown, the particular objects that are listed are virtual rocks and virtual walls or boundaries. The user may also specify still other virtual objects to present by providing text input to input box 724, e.g., using a soft keyboard or hard keyboard.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory, propagating signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. An apparatus, comprising:
   a first processor;
   a network adapter; and
   storage bearing instructions executable by a second processor for:
   identifying a first real-world object;
   altering presentation, on a display, of a first virtual rendition based on the identifying of the first real-world object; and
   presenting a graphical user interface (GUI), the GUI comprising an option that is selectable to enable alterations of presentations of virtual renditions based on identification of real-world objects;
   wherein the first processor transfers the instructions to the second processor over a network via the network adapter.

2. The apparatus of claim 1, wherein the instructions are executable for:
   altering presentation, on the display, of the first virtual rendition based on identifying the first real-world object as being within a threshold non-zero distance to a user, wherein the threshold non-zero distance is identified based on receipt of user input, wherein the user input specifies the threshold non-zero distance.

3. The apparatus of claim 1, wherein the GUI is a settings GUI for configuring one or more settings of a device that presents the GUI.

4. A device, comprising:
   at least one processor; and
   storage accessible to the at least one processor and bearing instructions executable by the at least one processor to:
   identify a first real-world object;
   alter presentation, on a display accessible to the at least one processor, of a first virtual rendition based on the identification of the first real-world object; and
   present a graphical user interface (GUI), the GUI comprising an option that is selectable to enable alterations of presentations of virtual renditions based on identification of real-world objects.

5. The device of claim 4, wherein the GUI is presented on the display.

6. The device of claim 4, wherein the device is a headset, and wherein the device comprises: the display and a housing that engages a user's head.

7. The device of claim 4, comprising the display.

8. The device of claim 7, wherein the device comprises a camera accessible to the at least one processor, the identification of the first real-world object being based at least in part on input from the camera.

9. The device of claim 7, wherein the device comprises at least one network interface accessible to the at least one processor.

10. The device of claim 7, wherein the device comprises at least one position sensor, wherein the first virtual rendition is altered based at least in part on input from the at least one position sensor.

11. The device or claim 10, wherein the at least one position sensor comprises at least one sensor selected from the group consisting of: a global positioning system (GPS) transceiver, an accelerometer, a gyroscope.

12. The device of claim 4, wherein the first virtual rendition is a virtual reality rendition.

13. The device of claim 4, wherein the first virtual rendition is an augmented reality rendition.

14. The device of claim 4, wherein the instructions are executable by the at least one processor to:
   alter presentation of the first virtual rendition based on: whether a user is identified as sitting, and/or whether the user is identified as standing.

15. The device of claim 4, wherein the instructions are executable by the at least one processor to:
   alter presentation of the first virtual rendition based on identification of the first real-world object as being within a threshold non-zero distance to a user, wherein the threshold non-zero distance is identified based on receipt of user input specifying the threshold non-zero distance.

16. A method, comprising:
   identifying a first real-world object;
   altering presentation, on a display, of a first virtual rendition based on the identifying of the first real-world object; and
   presenting a graphical user interface (GUI), the GUI comprising an option that is selectable to enable a device to alter presentations of virtual renditions based on identification of real-world objects.

17. The method of claim 16, wherein the GUI is presented on the display.

18. The method of claim 16, wherein the first virtual rendition is a virtual reality rendition and/or an augmented reality rendition.

19. The method of claim 16, comprising:

altering presentation of the first virtual rendition based on: whether a user is identified as sitting, and/or whether the user is identified as standing.

20. The method of claim 16, comprising:

altering presentation of the first virtual rendition based on identifying the first real-world object as being within a threshold non-zero distance to a user, wherein the threshold non-zero distance is identified based on receipt of user input specifying the threshold non-zero distance.

* * * * *